United States Patent Office 3,438,118
Patented Apr. 15, 1969

3,438,118
METHOD OF FORMING CERAMIC-TO-METAL SEAL
Alfred Milch, Teaneck, N.J., Joseph J. Lalak, Briarcliff Manor, and Richard H. Ahlert, Spring Valley, N.Y., assignors to North American Philips Company, Inc.
No Drawing. Original application June 10, 1965, Ser. No. 463,041, now Patent No. 3,366,409, dated Jan. 30, 1968. Divided and this application Jan. 16, 1968, Ser. No. 698,160
Int. Cl. B23k *31/02;* C04b *35/00, 37/00*
U.S. Cl. 29—472.9                         7 Claims

ABSTRACT OF THE DISCLOSURE

A method of manufacturing a hermetic ceramic-to-metal seal in which a spongy refractory metal bond is first formed between a ceramic body and a metal body which bond is then filled with an alumina-containing material which hermetically seals the spongy metal bond.

---

This application is a division of application Ser. No. 463,041, filed June 10, 1965, now Patent 3,366,409, granted Jan. 30, 1968.

Our invention relates to ceramic-to-metal seals and to a method of joining ceramics to metals in a vacuum tight manner. In particular, the invention relates to a method of joining a refractory metal such as molybdenum or tungsten to an alumina ceramic.

In a copending application Ser. No. 269,133, filed Mar. 29, 1963, now abandoned in favor of application Ser. No. 709,501, a method of joining bodies, one of which may be metal and the other ceramic is disclosed. In that method, the surfaces of the bodies to be joined are covered with a bonding material which contains CaO or BaO, $Al_2O_3$, and MgO or SrO. The bonding material then is heated to a temperature exceeding 1300° C. to form a melt whereafter the bonding material is cooled to solidify it.

We have found that seals made in this manner are relatively weak. There is no evidence of chemical attack of the bonding material on the metal, i.e., the bond appears to depend solely upon physical contact between the metal surface and the fused bonding material.

A principal object of our invention is to improve the mechanical strength of the seal described above without impairing its impermeability or high temperature resistance.

A further object of our invention is to provide a ceramic-to-metal seal which is resistant to attack by cesium vapor.

Another object of our invention is to provide an improved method of joining a refractory metal to an alumina ceramic.

Further objects of the invention will appear as the specification progresses.

In accordance with the invention, a strong but porous bond is formed between the metal and ceramic member to be joined and then the joint is rendered vacuum-tight by means of the bonding materials disclosed in application Ser. No. 269,133, now abandoned.

Thus, in a particular embodiment of the invention which is exemplary thereof, a suspension of molybdenum oxide in amylacetate nitrocellulose solution first was applied between the metal and ceramic members to be joined and the assembly fired in wet hydrogen at 1650° C. brightness or higher for approximately 10 minutes under slight pressure. This resulted in a porous but quite strong bond of molybdenum between the metal and ceramic. This joint was then covered with a water suspension of finely divided $Al_2O_3$ and $CaCO_3$ in a mol ratio of $5CaO:3Al_2O_3$. The assembly was reheated to 1650° C. brightness for twenty minutes to decompose the carbonate and to allow the mass to fuse over and into the molybdenum joint.

Alternatively, the molybdenum oxide suspension applied between the ceramic and metal members may be allowed to dry, after which the $5CaCO_3:3Al_2O_3$ suspension is applied as an overlayer. The entire firing may then be accomplished in a single step to produce the desired refractory hermetic bond of improved mechanical strength.

A disc of .002″ thick molybdenum sheet was thus joined to a one-half inch diameter alumina tube with a 0.050 in. wall. The bond that was formed was vacuum tight and resisted attempts to separate the original members to the extent that the molybdenum disc ruptured as the seal was destroyed. Examination of the ruptured molybdenum disc gave distinct evidence of chemical attack by the $MoO_3$, thus accounting for the increased mechanical strength.

It will be obvious to those skilled in the art that other metals such as tungsten or rhenium may be bonded to other ceramics which can be metallized by tungsten or molybdenum or mixtures thereof, such as spinel, magnesia, sapphire, and the like using the method herein described. Likewise, tungsten oxide may be used as a substitute for or mixed with the molybdenum oxide to form the spongy metal layer on the ceramic. Furthermore, the particular bonding material is exemplary only since any of those disclosed in application Ser. No. 269,133 may be employed herein. However, it should be noted that because of the extreme chemical reactivity between silica and alkali-metal the bonding material must be free of silica in order to maintain alkali vapor resistance.

Therefore, we do not wish to be limited to the particular materials disclosed herein since the invention is pointed out in the appended claims.

What we claim is:

1. A method of hermetically joining a metal body selected from the group consisting of molybdenum, tunsten and rhenium to a ceramic body selected from the group consisting of alumina, spinel, magnesia and synthetic sapphire comprising the steps of applying between the surfaces of the bodies to be joined a suspension of an oxide of a metal selected from the group consisting of molybdenum, tungsten, and mixtures thereof in an organic vehicle, firing the assembly in wet hydrogen at about 1650° C. brightness for about 10 minutes to form a spongy bond of said metal between the metal body and the ceramic, covering the metal bond between the bodies with an aqueous suspension of an alumina-containing ceramic material, heating the assembly to a temperature exceeding 1300° C. in an inert atmosphere to melt the material thereby rendering the bond hermetic, and cooling the material to solidify the same.

2. A method as claimed in claim 1 in which the alumina-containing material is silica-free.

3. A method as claimed in claim 2 in which the ceramic is alumina.

4. A method as claimed in claim 1 in which the alumina-containing material consists of $Al_2O_3$ and $CaCO_3$.

5. A method as claimed in claim 4 in which the mol ratio of $Al_2O_3$ to $CaCO_3$ is 5:3.

6. A method as claimed in claim 1 in which the suspension of the oxide of the metal is dried to form a layer of the metal oxide in a dried organic matrix which is covered with an aqueous suspension of $Al_2O_3$ and $CaCO_3$ before being heated to convert the metal oxide to metal.

7. A method as claimed in claim 1 in which the alumina-containing material includes an oxide selected from the group consisting of MgO and SrO and an oxide selected from the group consisting of CaO and BaO.

References Cited

UNITED STATES PATENTS

| | | | |
|---|---|---|---|
| 2,776,472 | 1/1957 | Mesick | 29—473.1 |
| 3,023,492 | 3/1962 | Bristow | 29—195 |
| 3,281,309 | 10/1966 | Ross | 65—43 X |
| 3,291,586 | 12/1966 | Chapman | 65—43 X |
| 3,317,298 | 5/1967 | Klomp | 65—43 X |
| 3,331,731 | 7/1967 | Baak | 65—43 X |
| 3,340,025 | 9/1967 | Milch | 29—195 |

JOHN F. CAMPBELL, *Primary Examiner.*

R. F. DROPKIN, *Assistant Examiner.*

U.S. Cl. X.R.

29—492, 494, 497, 500, 504; 65—43, 59; 117—129; 156—89